United States Patent Office 3,483,086
Patented Dec. 9, 1969

3,483,086
METHOD FOR INCREASING ALKALOID PRODUCTION OF SUBMERSE CLAVICEPS CULTURES
Géza Wack, Tibor Perényi, Éva Udvardy Nagy, née Oserei Pehány, and Erzsebet Zsoka, née Somkuti, Budapest, Hungary, assignors to Richter Gedeon Vegyeszeti Gyar RT., Budapest, Hungary, a firm
No Drawing. Filed Nov. 2, 1966, Ser. No. 591,405
Claims priority, application Hungary, Nov. 3, 1965, RI-287
Int. Cl. C12k 1/10
U.S. Cl. 195—81   4 Claims

ABSTRACT OF THE DISCLOSURE

A process for the production of ergot alkaloids from submerged Claviceps culture in a carbohydrate nutrient medium in which 5 to 50 g./liter of a nontoxic water-soluble salt (sodium chloride, calcium nitrate, potassium chloride or potassium nitrate) is used to increase the osmotic pressure in the medium by 2 to 25 atmospheres.

---

The invention relates to a process for increasing the alkaloid production of Claviceps cultures grown under aerobic submerged conditions and, more particularly, to a process for saprophytic alkaloid production.

The production of ergot alkaloids by saprophytic cultivation of Claviceps strains has recently become an important commercial method. Several reports have appeared in literature describing successful isolation and use of Claviceps strains having considerable productivity. Yet the result of such experiments depends mainly on maintaining working conditions which enhance alkaloid production and stabilize the productivity of alkaloid-producing strains. Optimal conditions of a stable and high alkaloid production could, however, not be established heretofore in spite of various partial solutions.

It has already been stated that there is a connection between the yield of alkaloid production and sugar concentration in the nutrient medium. By increasing sugar concentration the quantity of the produced mycelia can also be increased to a certain degree; on the other hand, an increase in the sugar concentration increases also the rate of sugar-metabolism, which again increases the alkaloid production.

We have investigated whether and how far such an increase of the alkaloid production would be due to the osmotic pressure in the nutrient medium, caused by sugar concentration. A certain connection between the alkaloid production of the fungi and the osmotic pressure of the medium has already been reported; according to E. Teuscher (Die Pharmazie, 16, 570/1961) Claviceps mycelia grown under saprophytic conditions in surface or submerged cultures, were separated from the nutrient medium, transferred into a buffer solution and it has been found that such a "reposing" culture, impeded in its further growth, also produces alkaloids; this alkaloid production can be increased by increasing the osmotic pressure in the buffer solution (by adding mannit or salt). Nothing whatsoever has been reported in literature about observations concerning osmotic pressure of the nutrient media used for growing fungi.

In order to solve this problem we have tried to increase the osmotic pressure of the nutrient medium by adding such quantities of sugar which would exceed the sugar consuming capacity of fungi; on the other hand we have also tried to achieve a similar increase of the osmotic pressure of the nutrient medium, as affected by the high sugar concentration, without using additional sugar quantities, by adding inorganic salts, especially sodium chloride.

Inorganic salts are added to every nutrient medium in order to create the possibility of biological processes; the salt quantities used for this purpose are, however, small and generally do not surpass the quantity of 1–2 g./liter. Their contribution to the osmotic pressure of the nutrient medium consisting primarily of organic ingredients, is practically insignificant (at most 1 atm.).

Surprisingly it has been found that the addition of 5 to 50 mg./ml. (5–50 g./liter) of nontoxic salts (i.e. of such large salt quantities as may exceed 10 to 20 times the usual salt concentration and increase the osmotic pressure in the nutrient medium by 2 to 25 atm.) does not impede the growth of fungi; on the contrary, this high salt concentration has a very salutary effect upon the development of the culture, since it impedes the disintegration of the hypha-cells occurring as a consequence of the increased metabolism and, rather causes a very substantial increase of alkaloid production. Presumably the favorable effect is due to the substantially increased osmotic pressure, since maximal alkaloid production is achieved at certain values of osmotic pressure, independently of the quality of the nontoxic salt used to increase osmotic pressure.

For increasing the osmotic pressure, a number of water-soluble salts may be used, provided that they are not toxic for fungi. The preferable such salts are the alkaline or alkaline-earth metal chlorides and sulphates, alkali carbonates, alkali phosphates etc.; the use of sodium chloride, however, is the most advantageous both from an economic and technological point of view.

Though the required increase of osmotic pressure in the culture medium could also be achieved by increasing the sugar concentration of the nutrient medium, this is not advantageous, since—apart from economic disadvantages—the required increase in sugar concentration increases the viscosity of the medium to an undesirable extent, thus hindering aeration and processing of the culture medium; such high sugar concentrations also cause an intensive polysaccharide production by the Claviceps strains, whereby growing such cultures in fermentors would be difficult and, in some cases, impossible. In using salts, especially sodium chloride to increase osmotic pressure, the polysaccharide formation is decreased or even hindered. Another advantage of using inorganic salts, especially sodium chloride, is the fact that owing to their much lower molecular weight, substantially smaller amounts of salt are needed to increase osmotic pressure than in the case of organic substances of greater molecular weight, especially sugars.

Yet the advantageous influence of the increasing of osmotic pressure is not unlimited; in the course of experiments made with increasing salt concentrations in otherwise identical nutrient media, using the same Claviceps strains, it has been found that the growth of mycelia increases also up to a certain point of the osmotic pressure; later, however, if osmotic pressure is further increased, first a partial, then a total hindrance of the growth of mycelia is observed. The alkaloid production shows with the increase of osmotic pressure a similar behavior, attaining first an optimal value and if osmotic pressure is further increased it also decreases. Maximal alkaloid production is attained—according to our observations—at the osmotic pressure where the growth of fungi just begins to be partially impeded.

These conditions exist in similar ways with every nutrient medium adapted to saprophytic growing of Claviceps strains; the really optimal values of the osmotic pressure, yielding maximal alkaloid production, depend, however, upon the composition of the nutrient medium and also upon the Claviceps strain used. By adding a nontoxic inorganic salt to a suitable liquid nutrient medium, an optimal osmotic pressure of the nutrient medium can be achieved, where with a minimal hindrance of growth of the culture and a substantially increased alkaloid production can be attained. This optimal value of the osmotic pressure can easily be tested with any nutrient medium and any Claviceps strain, and it can easily be attained in industrial alkali-producing fermentation by adding an adequate quantity of an inorganic salt.

The invention concerns thus a process for increasing alkaloid production of submerged Claviceps cultures, characterized in that to the nutrient medium for growing the Claviceps culture, a water-soluble inorganic salt nontoxic for fungi is added in a quantity to increase osmotic pressure of the nutrient medium by 2 to 25 atm.

The increased osmotic pressure obtained by addition of inorganic salts is constantly maintained during the alkaloid-producing fermentation. Should the osmotic pressure of the nutrient medium substantially decrease owing to exhausting of organic nutrient substances during fermentation, further quantities of inorganic salt can be added to remedy or correct the loss of osmotic pressure.

In order to establish simple calculation methods for the composition of nutrient media and for industrial control, the osmotic pressure for practical purposes can be calculated on basis of the Van t'Hoff formula $$P = \frac{RT}{V}$$

wherein T is the temperature of the medium in Kelvin degrees absolute, V is the molar concentration of the dissolved substances and R=0.0821; in the concentration of water soluble inorganic salts the electrolytic dissociation is also to be considered; the degree of dissociation of the salts used can be assumed for the purpose of the present invention to be 100%.

The process according to the invention differs substantially from the experiments described by E. Teuscher (loc. cit.) since in these no high salt concentrations were used, mycelia were separated from the fermentation medium only after the fermentation has been carried out in the normal way, transferred into a medium not appropriate for further growing of the culture; in the medium which did not contain nutrient media necessary for the growth of fungi, the osmotic pressure was increased by addition of sugars or salts and the mycelia were further incubated in this medium for 2–3 days. This so-called "replacement" method has also been used by other authors cited by E. Teuscher. In this method the so-called resting cultures (and not those in the development period) are exposed to an increased osmotic pressure; this does not only involve a different principle, but it is also disadvantageous from a practical point of view, since the increase of alkaloid production—owing to the delayed exposure to the osmotic effect—is much lower (2–3 times, in contradistinction to the 5 to 10 times higher yield attained by the process according to the invention); furthermore the advantageous influence of the increased osmotic pressure for the hindrance of the disintegration of cells and of polysaccharide formation is not utilized. The process according to the invention is much more advantageous also from a technical point of view, since the separation and further incubation of mycelia as used in the so-called "replacement"-method is very complicated on an industrial scale and the production of alkaloids is considerably delayed by this further incubation. These difficulties and disadvantages do not occur in the process according to the invention.

The process according to the invention eliminates all disadvantages of the so-called "replacement"-method. By increasing osmotic pressure in the nutrient medium by 2 to 25 atm. in the industrial production of alkaloids through growing Claviceps strains in submerged cultures, the following advantages are attained.

(1) Alkaloid production is increased from 5 to 10 times (as compared to cultures without addition of salt);

(2) a substantial alkaloid production is also obtained on nutrient media where fungi develop well even without the addition of salt, but produce no alkaloids;

(3) Claviceps strains which under normal conditions produce no or only very small amounts of alkaloids show under the influence of salt addition according to the invention a substantial production of ergot alkaloids; and (4) the detrimental trend to increase in the viscosity of the nutrient medium in the case of strains apt to form polysaccharides is impeded and the fermentation broth can be aerated and stirred easily without further difficulties.

The process according to the invention has proved to be successful in the production of both alkaloids: of the peptide type and of the clavine type. The method according to the invention yielded equally good results under industrial conditions, using various Claviceps strains, such as a mutant strain (Ix 13–26) selected from rye-sclerotia and producing ergotoxine, a natural strain (T–20) producing ergotamine, a strain obtained from *Pennisetum typhoideum* and producing agroclavine and elimoclavine (B–35), finally a strain obtained from *Paspalum distichum* and producing ergometrine and clavine alkaloids (PA–me).

The process according to the invention and the advantages obtained by same are illustrated in greater details in the following examples.

EXAMPLE 1

From a 30-day-old culture of the ergotoxine-producing *Claviceps purpurea* strain Ix 13–26 (grown on an inclined malt-agar nutrient medium) the mycelia were separated and suspended in sterile water; this suspension has been used for inoculation of 100 ml. of the following liquid nutrient medium:

|  | Osmotic pressure, percent | Atm. |
|---|---|---|
| Saccharose | 10 | 6.7 |
| Succinic acid | 1 | 2.05 |
| $Ca(NO_3)_2$ | 0.1 | 0.43 |
| $KH_2PO_4$ | 0.025 | 0.08 |
| $MgSO_4$ | 0.025 | 0.10 |
| KCl | 0.012 | 0.08 |
| (pH value (adjusted with $NH_4OH$) 5.2) | | |

The culture was incubated at a temperature of 24° C. on a shaking table; after 7 days, 2 portions of the above nutrient medium were inoculated with 25 ml. of this culture and shaken for 6 days at a temperature of 24° C. With the inoculum so obtained two laboratory fermentors containing 6 liters of the above nutrient medium were inoculated and two parallel fermentations were begun; to one of these cultures 2.0% sodium chloride (osmotic pressure 16.18 atm.) was added, while the other culture was fermented without salt addition.

Fermentation was carried out for 8 days under aeration (0.5 vol./vol./min.) at 24° C.; the produced alkaloids were extracted with a mixture of chloroform and isopropanol. The organic extract was shaken out with a 1% aqueous tartaric acid solution and the alkaloid content of the aqueous phase was determined with van Urk reagent.

The fermentation broth, containing 2.0% NaCl shows an alkaloid content of 1800 mg./liter; the fermentation product obtained without addition of salt shows an alkaloid content of only 400 mg./liter.

EXAMPLE 2

A *Claviceps purpurea* strain B–35 obtained from *Pennisetum typhoideum* and grown on potato-agar was inoculated into a liquid nutrient medium consisting of:

| | Percent |
|---|---|
| Saccharose | 10 |
| L-asparagine | 1.0 |
| Ca(NO$_3$)$_2$ | 0.1 |
| KH$_2$PO$_4$ | 0.025 |
| MgSO$_4$ | 0.025 |
| KCl | 0.012 | pH value (adjusted with NH$_4$OH), 5.2.

and shaken for 8 days at 24° C. Hereafter 25 ml. of this culture were transferred into 2 portions (each of 300 ml.) of the above nutrient medium and shaken for a further 5 days at 24° C.

Two parallel fermentations were begun in two laboratory fermentors each containing 6 liters of nutrient medium, with the inoculum-cultures obtained in the above described manner; the nutrient medium is composed as described above. To one of these nutrient media 0.6% of Ca(NO$_3$)$_2$ was added, whereas the other fermentation was carried out—for sake of comparison—without addition of salt. After 8 days of fermentation (at 24° C., under aeration with 0.5 vol./vol./min. air) the produced alkaloids are extracted with a mixture of chloroform and isopropanol; the organic phase was shaken out with 1% aqueous tartaric acid solution and the alkaloid content of the aqueous extract was determined by the van Urk color reaction method, calculated on lysergic acid. Values found:

| | Mg./liter |
|---|---|
| With addition of Ca(NO$_3$)$_2$ | 2400 |
| Without salt addition | 185 |

EXAMPLE 3

A shaken culture of a *Claviceps purpurea* strain—producing ergotamine under parasitic conditions—was spread out on a nutrient medium according to Example 1, but solidified with agar; after 3 weeks of incubation at 24° C. the colonies showing fluorescence in ultraviolet light were inoculated in 4 portions of 100 ml. each of the liquid nutrient medium according to Example 1. To 2 of these cultures 2.4% sodium chloride (osmotic pressure 20.2 atm.) was added, whereas the two other cultures were grown without addition of salt. All cultures were then shaken for 10 days at 24° C. Cultures with salt addition showed an alkaloid-content of 70 mg./liter (determined with van Urk reagent), while in those without salt addition no alkaloid content whatsoever was found.

EXAMPLE 4

A small piece of a sclerotium obtained from *Paspalum distichum* was sterilized on its surface and put on a malt-agar plate. The culture developed thereon was transferred into 100 ml. of a nutrient medium according to Example 1. After 8 days of shaking at 24° C. the culture was homogenized; with 10 ml. of this culture 100 ml. of the following nutrient media were inoculated:

(a) liquid nutrient medium according to Example 1,
(b) same, with addition of 1% KNO$_3$
(c) same, with addition of 2% KNO$_3$
(d) same, with addition of 3% KNO$_3$
(e) same, with addition of 4% KNO$_3$
(f) same, with addition of 5% KNO$_3$.

These cultures were shaken for 8 days at 24° C., then their alkaloid content was determined according to the method described in Example 2. Determinable quantities can only be found in cultures (c) and (d).

From culture (d) 10 ml. were transferred into 100 ml. of the nutrient medium described in Example 1, with the addition of 3% KNO$_3$ (osmotic pressure 14.4 atm.), the culture was shaken for 8 days at 24° C. and this process was repeated three times. After the fourth passage the culture, having been shaken for 8 days, showed an alkaloid content of 420 mg./liter; the produced alkaloid mixture had according to quantitative paper-chromatographic analysis the following composition:

| | Percent |
|---|---|
| Ergometrin | 30 |
| Ergometrinine | 5 |
| Agroclavine | 8 |
| Elimoclavine | 10 |
| Cannoclavine | 30 |
| Other water-soluble alkaloids | 17 |

EXAMPLE 5

10 portions of 200 ml. nutrient medium (according to Example 1) were inoculated with a culture of the *Claviceps purpurea* strain Ix 13–26, grown on malt agar. After 8 days' shaking at 24° C. the so-obtained inoculum cultures (in portions of 400 ml. each) were transferred into five laboratory fermentors, which contained each 6 liters of the same nutrient medium, yet with the addition of 2% sodium chloride. These cultures were incubated for 7 days at 24° C., under stirring (220 r.p.m.) and aeration (1 vol./vol./min.); then the cultures were combined and 25 liters thereof were transferred into an industrial fermentor containing 400 liters of the nutrient medium according to Example 1; here fermentation was continued under the same conditions for 4 days, whereupon the fermentation medium showed a pH-value of 4.6 to 4.8, a dry substance content of 1.0 to 1.2%, and an alkaloid content of 80 to 120 mg./liter.

300 liters of this culture were then transferred into an acid-resistant fermentor containing 3000 liters of nutrient medium having the same ingredients as described above but with the addition of 2.0% sodium chloride (osmotic pressure 6.4 atm.). Fermentation was continued for 10 days under stirring (200–300 r.p.m.) and aeration (0.5 to 1.0 vol./vol./min.) at 24° C. After 10 days the fermentation medium showed an alkaloid content of 520 mg./liter.

The alkaloid mixture isolated in the known manner had the following composition:

| | Mg./liter |
|---|---|
| Ergotoxine base | 80 |
| Ergometrine-maleate | 105 |
| Cannoclavine | 20 |
| Various clavine-alkaloids | 15 |

What we claim is:

1. In a process for the production of ergot alkaloids by cultivating submerged cultures of Claviceps strains in a carbohydrate-containing Claviceps-culture nutrient medium, the improvement which comprises the step of adding to said medium 5 to 50 g./liter of an inorganic salt nontoxic with respect to the Claviceps culture and sufficient to increase the osmotic pressure of the nutrient medium by 2–25 atmospheres.

2. The improvement defined in claim 1 wherein said salt is added to said nutrient medium in a quantity just sufficient to partially impede fungus growth in said medium.

3. The improvement defined in claim 1 wherein said inorganic salt is selected from the group which consists of sodium chloride, calcium nitrate, potassium chloride and potassium nitrate.

4. In a process for producing ergot alkaloids by the cultivation of a submerged Claviceps culture in a carbohydrate nutrient medium, the improvement wherein said nutrient medium is selected from the group which consists of:

| | Percent |
|---|---|
| Saccharose | 10 |
| Succinic acid | 10 |
| $Ca(NO_3)_2$ | 0.1 |
| $KH_2PO_4$ | 0.025 |
| $MgSO_4$ | 0.025 |
| KCl | 0.012 | pH value (adjusted with $NH_4OH$), 5.2 and

| | |
|---|---|
| Saccharose | 10 |
| L-asparagine | 1.0 |
| $Ca(NO_3)_2$ | 0.1 |
| $KH_2PO_4$ | 0.025 |
| $MgSO_4$ | 0.025 |
| KCl | 0.012 | pH value (adjusted with $NH_4OH$), 5.2 and adding to said nutrient medium at least one inorganic salt selected from the group which consist of sodium chloride, calcium nitrate, potassium chloride and potassium nitrate in an amount of 5 to 50 g./liter and sufficient to raise the osmotic pressure of said medium by 2 to 25 atmospheres.

References Cited

UNITED STATES PATENTS

| | | | |
|---|---|---|---|
| 2,809,920 | 10/1957 | Stoll et al. | 195—81 |
| 3,117,917 | 1/1964 | Adams | 195—81 |
| 3,224,945 | 12/1965 | Tyler | 195—81 |

ALVIN E. TANENHOLTZ, Primary Examiner

U.S. Cl. X.R.

195—100